United States Patent [19]

Caveney

[11] Patent Number: 4,866,816
[45] Date of Patent: Sep. 19, 1989

[54] ONE-PIECE CABLE TIE

[75] Inventor: Jack E. Caveney, Hinsdale, Ill.

[73] Assignee: Panduit Corp., Tinley Park, Ill.

[21] Appl. No.: 462,264

[22] Filed: Apr. 19, 1974

[51] Int. Cl.$^4$ .............................................. F16L 33/00
[52] U.S. Cl. ................................ 24/16 PB; 24/17 AP;
24/30.5 P; 248/74.3; 264/291; 264/296
[58] Field of Search ............. 264/291, 296; 24/16 PB,
24/17 AP, 30.5 P; 248/74.3

[56] References Cited

U.S. PATENT DOCUMENTS

| | | | |
|---|---|---|---|
| 2,191,703 | 2/1940 | Anderson | 264/328.1 |
| 3,339,246 | 9/1967 | Geisinger | 24/16 PB |
| 3,380,122 | 4/1968 | Kirk | 264/291 |
| 3,747,164 | 7/1973 | Fortsch | 24/16 PB |
| 3,766,608 | 10/1973 | Fay | 24/16 PB |
| 3,767,753 | 10/1973 | Suzuki | 264/328 |
| 3,816,878 | 6/1974 | Fulton et al. | 24/16 PB |
| 3,887,965 | 6/1975 | Schuplin | 24/16 PB |
| 3,983,603 | 10/1976 | Joyce | 24/30.5 P |

Primary Examiner—Jeffrey Thurlow
Attorney, Agent, or Firm—Charles R. Wentzel; Mark D. Hilliard

[57] ABSTRACT

A flexible one-piece cable tie for harnessing a bundle of wires or the like, the cable tie including an elongated, flexible strap having a ladder structure comprising a plurality of spaced rung-like members with intermediate openings for receiving a locking pawl, the locking pawl being disposed within an enclosed head integral with the strap at one end thereof.

39 Claims, 6 Drawing Sheets

ONE-PIECE CABLE TIE

BRIEF SUMMARY OF THE INVENTION

The present invention relates to a one-piece cable tie including an elongated flexible strap having an integral enclosed head at one end thereof. A guide channel is formed through the head to permit threading of the free end of the strap therethrough, and a locking pawl is disposed within the head adjacent the guide channel for cooperation with openinggns formed in the strap. The cable tie is wrapped around a bundle of wires or the like, and the free end of the strap is drawn through the guide channel in the head and pulled tight so as to tension the strap around the bundle. Upon release of the strap, the compressed bundle will exert a reverse pull tending to withdraw the strap from the head and causing the locking pawl in the head to project through one of the openings in the strap thereby preventing withdrawal of the same.

In accordance with the present invention, the elongated, flexible strap is formed with a plurality of openings separated by cross members in the form of transverse rungs, whereby the strap body comprises a ladder structure. In accordance with an alternative form of the invention, a thin film may be formed between the ladder rungs, such film being penetrated by the locking pawl when the strap has been pulled through the head member and the threading force relaxed causing reverse thrust to be applied to the strap. In all such embodiments of the invention, when the cable tie is locked around a bundle of wires or the like, the locking pawl will project between a pair of the cross members or rungs so as to extend through the strap, whereby the locking pawl will positively prevent withdrawal of the strap from the head.

Another feature of the present invention relates to a process for making a cable tie, including the steps of molding a plastic cable tie and thereafter heating and stretching the same. In accordance with such a method, the cable tie as molded is of a size substantially smaller than the desired full size thereof, since it may be elongated during the stretching operation to several times its original length.

It is therefore a general object of the present invention to provide an improved molded, one-piece cable tie including an elongated, flexible ladder-type strap and an integral enclosed head having an internal locking pawl for cooperation with openings or thin, penetrable portions formed between spaced cross members or rungs of the strap body.

The foregoing and other objects and advantages of the invention will be apparent from the following description of certain preferred embodiments thereof, taken in conjunction with the accompanying drawings.

Now, in order to acquaint those skilled in the art with the manner of making and using my invention, I shall describe, in conjunction with the accompanying drawings, certain preferred embodiments of the invention.

DETAILED DESCRIPTION OF THE INVENTION

Figure 1:
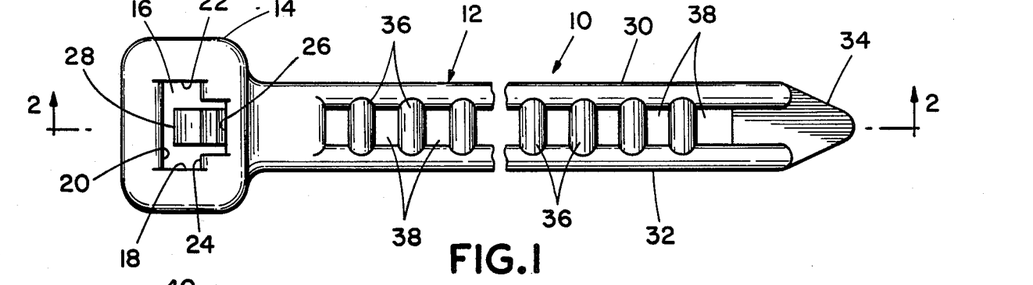
FIG. 1 is a plan view of a ladder-type cable tie constructed in accordance with the present invention.
Figure 2:
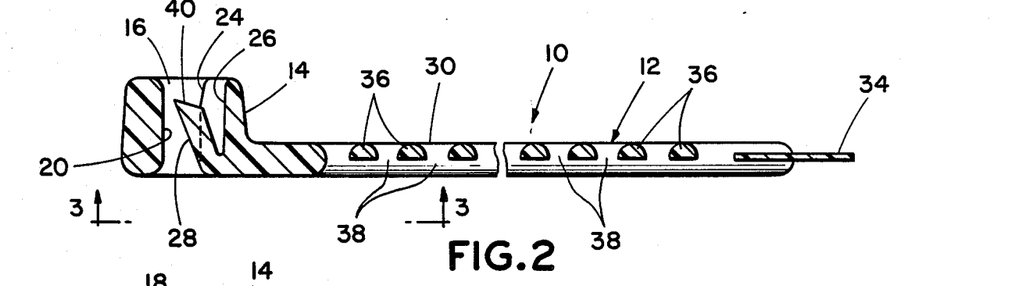
FIG. 2 is a section taken substantially along the line 2—2 of FIG. 1.
Figure 3:
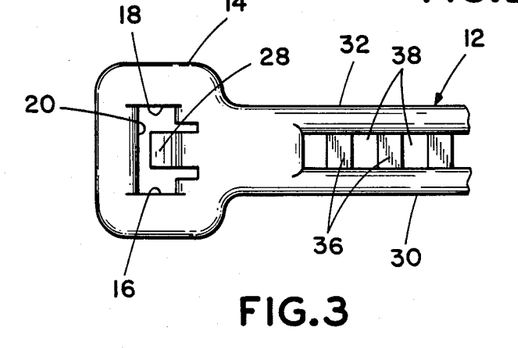
FIG. 3 is a fragmentary view looking approximately in the direction of the arrows 3—3 of FIG. 2.

Referring now to the drawings, and particularly to FIGS. 1-6, there is shown a cable tie 10 comprising a ladder-type strap 12 having an integral head 14 formed at one end thereof. The head 14 has a guide channel 16 formed therein defined by walls 18, 20, 22 and 24, and the latter wall 24 has an auxiliary channel 26 formed therein. The head 14 is provided with an integral deflectable pawl 28 having its root portion disposed within the auxiliary channel 26, and when in its relaxed position the free end of the pawl extends into the guide channel 16 as shown in FIGS. 1 and 2.

The strap 12 comprises a pair of longitudinal rail or side members 30 and 32 which may be oval or circular in cross-sectional configuration and which terminate at a strap tail portion comprising a flat, thin generally triangularly shaped tail member 34. A plurality of rungs 36 extend transversely between the rails 30 and 32 at spaced intervals therealong thereby defining a plurality of intermediate openings 38. In the embodiment illustrated, the rungs 36 are generally semi-circular in cross-sectional configuration, and the strap 12 extends from the head 14 so as to be perpendicular to the guide channel 16, the rungs 36 being arranged so that when the strap if flexed and threaded through the guide channel 16, flat face portions of the rungs engage seriatim against the pawl 28.

Figure 4:
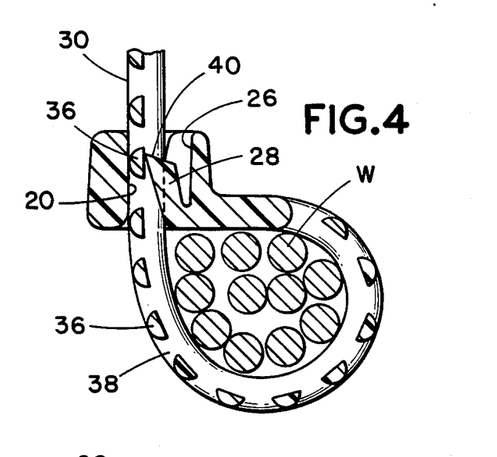
FIG. 4 is a sectional view showing the cable tie of FIG. 1 wrapped on a bundle of wires, the strap being shown as it is being threaded through the head to tension the strap around the bundle.
Figure 5:
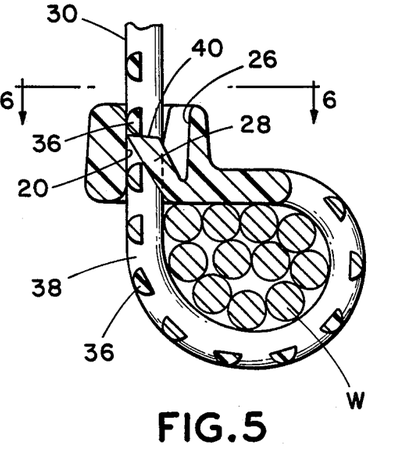
FIG. 5 shows the cable tie of FIG. 4 after the threading force has been relaxed and the strap has assumed a locked position.
Figure 6:
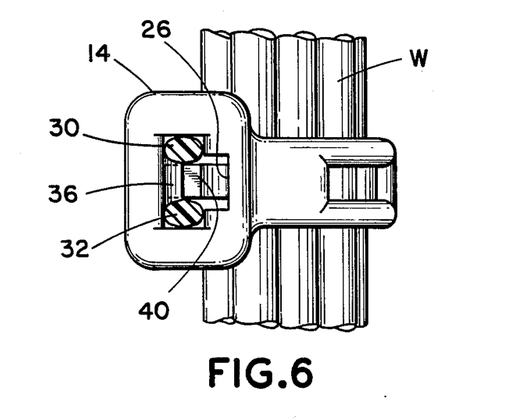
FIG. 6 is a view taken substantially along the line 6—6 of FIG. 5.

In operation, the cable tie 10 is wrapped around a bundle of wires W or the like, and the free end of the strap is threaded through the guide channel 16 as shown in FIG. 4 whereby the pawl 28 is repeatedly deflected from its relaxed position of FIG. 2 to the position of FIG. 4 as it is engaged by the various rung members 36. After the strap 12 has been drawn up tight around the bundle of wires W, and the threading force is relaxed, the compressed bundle W will apply a reverse pull on the strap. However, the strap will be locked after only a slight reverse movement due to the pawl 28 which will move into one of the openings 38 so as to abut against an adjacent rung member 36 as shown in FIG. 5, thereby positively locking the strap against withdrawal from the head 14.

In the embodiment described in FIGS. 1-6, locking is effected by engagement of one of the rungs 36 against a flat end portion 40 on the pawl 28. It will be noted that during the locking operation, the pawl 28 is deflected outwardly beyond its relaxed position of FIG. 2 into the position of FIG. 5 wherein the pawl abuts against the wall 20 of the guide channel 16. In this manner, the pawl 28 is firmly supported in the locked position so that the cable tie 10 can withstand a considerable withdrawal force on the strap 12 without fracturing or damaging any of the components.

Figure 7:
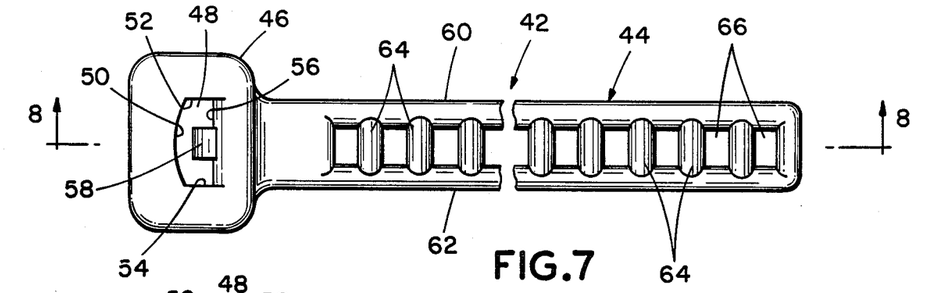
FIG. 7 is a plan view of an alternative embodiment of a ladder-type cable tie constructed in accordance with the present invention.
Figure 8:
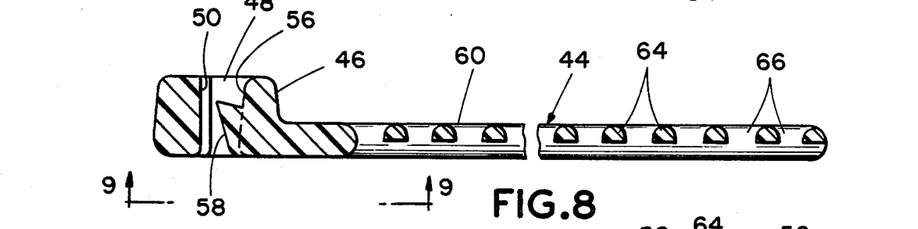
FIG. 8 is a section taken substantially along the line 8—8 of FIG. 7.

FIGS. 7-13 disclose an alternative embodiment of the present invention wherein a rigid locking pawl is employed in place of the deflectable pawl 28. There is shown a cable tie 42 comprising a ladder-type strap 44 having an integral head 46 formed at one end thereof. The head 46 has a guide channel 48 formed therein defined by an arcuate wall 50, a pair of side walls 52 and 54, and a generally flat wall 56. A rigid pawl 58 is integral with the wall 56 so as to project into the guide channel 48 toward the arcuate wall 50 as shown in FIGS. 7 and 8.

The strap 44 comprises a pair of longitudinal rail or side members 60 and 62 which may be oval or circular in cross-sectional configuration. A plurality of rungs 64 extend transversely between the rails 60 and 62 at spaced intervals therealong thereby defining a plurality of intermediate openings 66. In the embodiment illustrated, the rungs 64 are generally semi-circular in cross-sectional configuration, and the strap 44 extends from the head 46 so as to be perpendicular to the guide channel 48. The rungs 64 are arranged so that when the strap is threaded through the guide channel 48, the flat faces of the rungs engage seriatim against the rigid pawl 58 as shown in FIG. 10.

Figures 9, 10, 11, 12, 13:
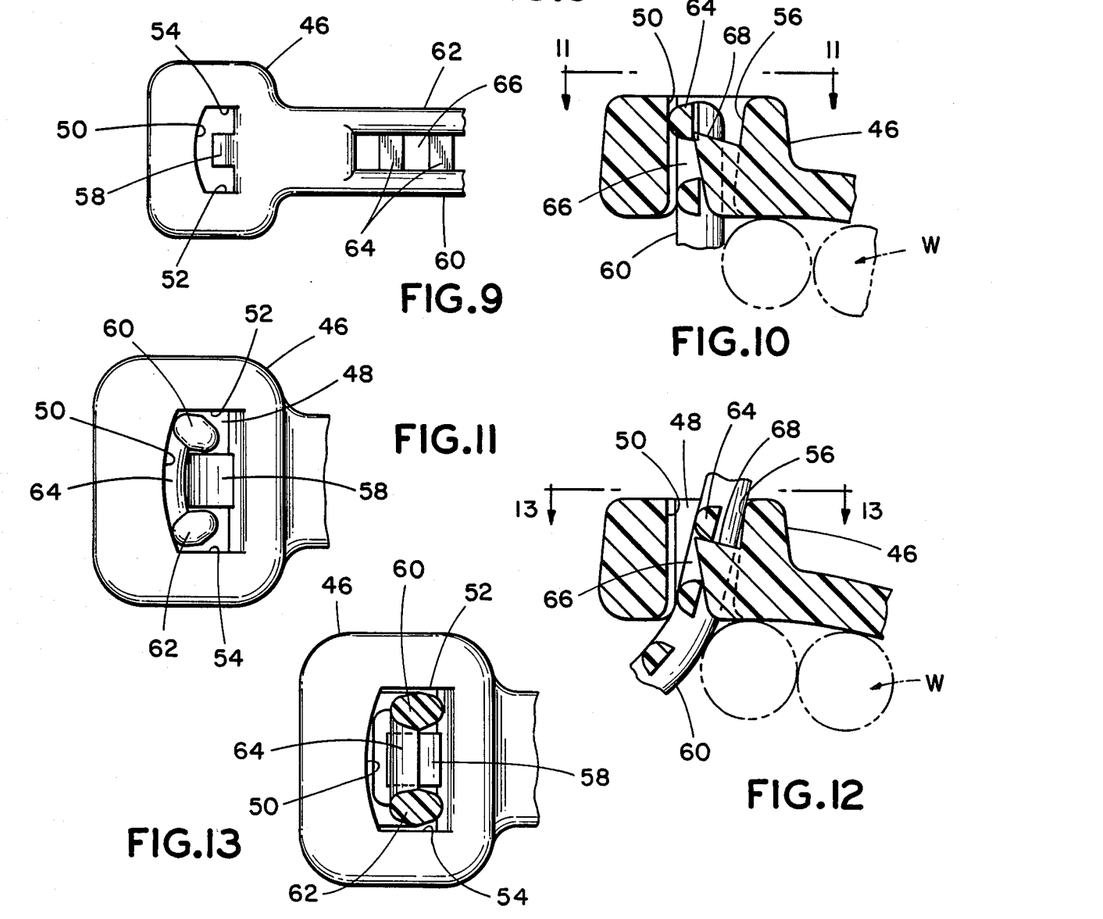
FIG. 9 is a fragmentary view looking approximately in the direction of the arrows 9—9 of FIG. 8.
FIG. 10 is a fragmentary sectional view showing the strap being pulled past a rigid locking pawl within the enclosed head.
FIG. 11 is a fragmentary plan view looking approximately in the direction of the arrows 11—11 of FIG. 10.
FIG. 12 is a sectional view similar to FIG. 10 showing the strap after the threading force has been relaxed and the strap has moved to a locked position relative to the fixed locking pawl.
FIG. 13 is a fragmentary plan view looking approximately in the direction of the arrows 13—13 of FIG. 12, the strap member being shown in section.

In operation, the cable tie 42 is wrapped around a bundle of wires W or the like and the free end of the strap is threaded through the guide channel 48 as shown in FIG. 10, whereby the rigid pawl 58 is repeatedly engaged by the flat faces of the rung members 64. It will be seen that sufficient clearance is provided between the outer portion of the rigid pawl 58 and the oppositely disposed central portion of the arcuate wall 50 to permit the rungs 64 to pass therebetween. However, the clearance is reduced at those portions of the arcuate wall adjacent the side walls 52 and 54 of the guide channel 48. Accordingly, the rungs 64 must be deflected into a somewhat arcuate configuration as they engage the pawl 58 (see FIG. 11) in order to move through the clearance space provided.

The foregoing structure is quite advantageous for the reason that a rung 64 is deflected into an arcuate configuration as shown in FIG. 11 in order to move past the rigid pawl 58, and once it snaps past the pawl the rung will resume its relaxed or straight configuration so that when subjected to a reverse pull one of the rungs of the strap necessarily abuts against the pawl 58 as shown in FIGS. 12 and 13. Moreover, the locking surface 68 on the pawl is sloped, as shown for example in FIG. 12, so that a withdrawal force on the strap will cause the trapped rung 64 to move still further toward the wall 56. It will thus be understood that the strap 44 is drawn tight around a bundle of wires W, and thereafter the threading force is relaxed whereby the compressed bundle applies a reverse pull on the strap causing the latter to assume a locked postion as shown in FIG. 12.

Figure 14:
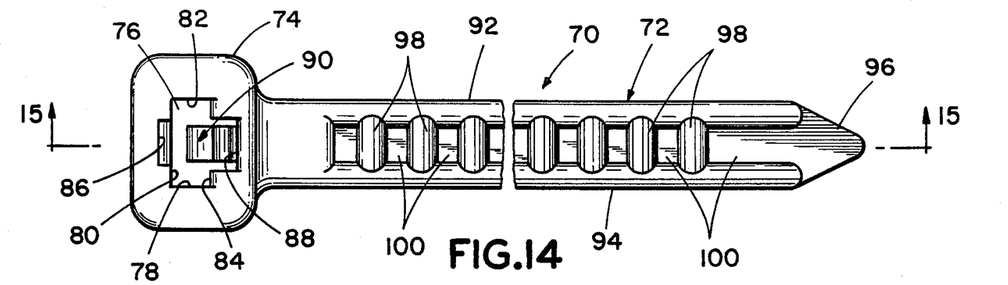
FIG. 14 is a plan view of another alternative embodiment of a ladder-type cable tie constructed in accordance with the present invention.
Figures 15, 16, 17, 18, 19, 20, 21:
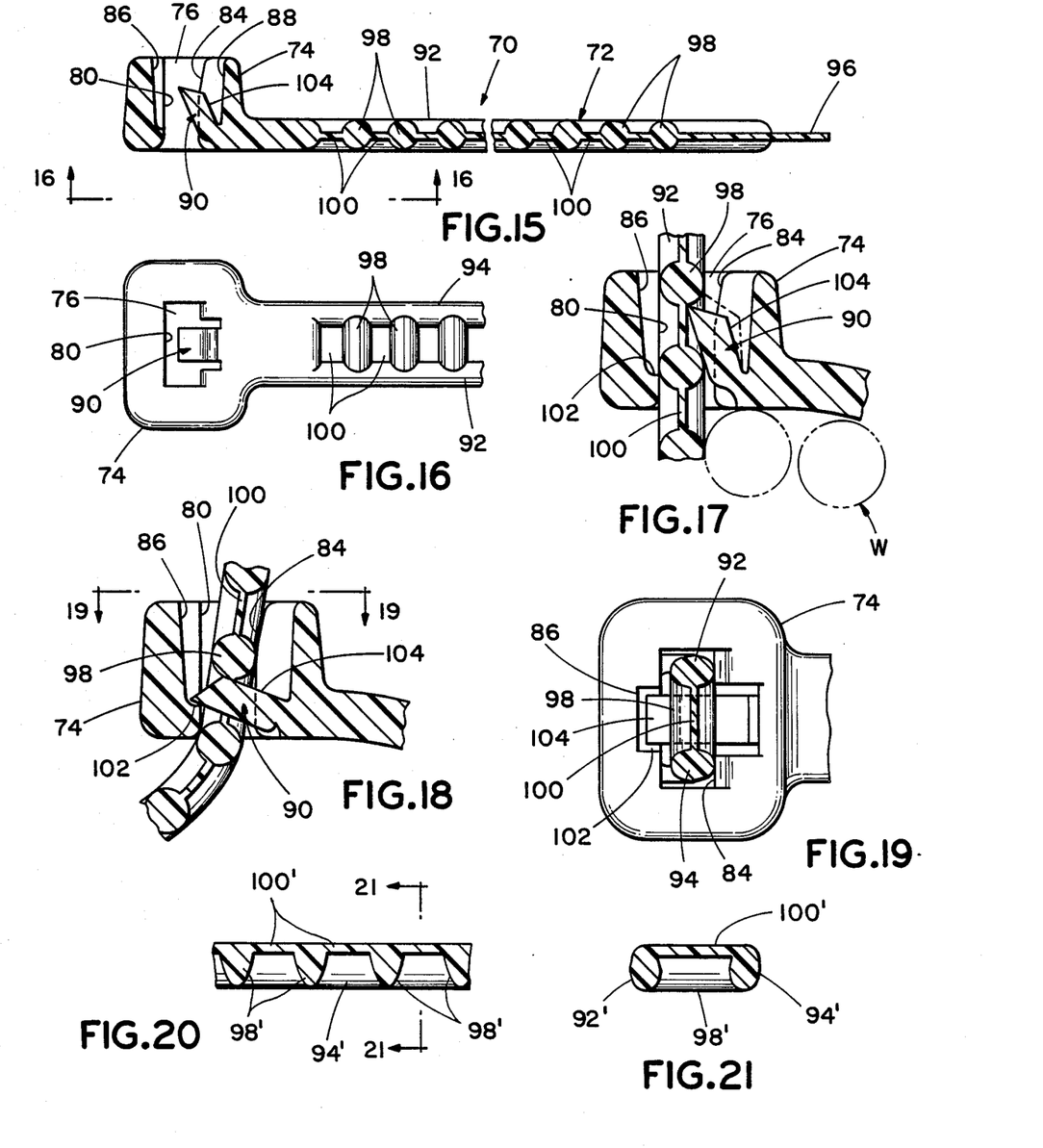
FIG. 15 is a sectional view taken substantially along the line 15—15 of FIG. 14.
FIG. 16 is a fragmentary view looking approximately in the direction of the arrows 16—16 of FIG. 15.
FIG. 17 is a fragmentary sectional view showing the strap being threaded through the head and thereby pulled past a deflectable locking pawl within the enclosed head.
FIG. 18 is a sectional view similar to FIG. 17 showing the strap after the threading force has been relaxed and the strap subjected to reverse thrust causing the pawl to penetrate a thin film between the rungs of the ladder-type strap so as to lock the strap against withdrawal.
FIG. 19 is a fragmentary plan view looking substantially in the direction of the arrows 19—19 of FIG. 18, the strap being shown in section.
FIG. 20 is a fragmentary longitudinal sectional view showing an alternative cross-sectional configuration for the strap portion of the cable tie for FIGS. 14–19.
FIG. 21 is a sectional view taken substantially along the line 21—21 of FIG. 20.

FIGS. 14-19 disclose an additional embodiment of the present invention where the ladder-type strap member has a very thin penetrable web or film formed between the transverse rung members rather than the openings disclosed in the embodiments described previously. There is shown a cable tie 70 comprising a ladder-type strap 72 having an integral head 74 formed at one end thereof. The head 74 has a guide channel 76 formed therein defined by walls 78, 80, 82 and 84. The wall 80 has a first auxiliary channel 86 formed therein, and the opposite wall 84 is provided with a second auxiliary channel 88. The head 74 encloses an integral deflectable pawl 90 having its root portion disposed within the second auxiliary channel 88, and when in its relaxed position the free end of the pawl 90 extends into the guide channel 76 as shown in FIGS. 14 and 15.

The strap 72 comprises a pair of longitudinal rail or side members 92 and 94 which may be oval or circular in cross-sectional configuration and which terminate at a strap tail portion comprising a flat, thin generally triangularly shaped tail member 96. A plurality of rungs 98 extend transversely between the rails 92 and 94 at spaced intervals therealong, and a thin web or film 100 is formed between each of the rung members, it being understood that the cable ties of the present invention are molded of plastic material as is well known in the art, and the web or film portions 100 may readily be formed in the molding operation. Specifically, the cable ties are molded by injecting a thermoplastic material into a mold.

In the embodiment being described, the rungs 98 are circular in cross-sectional configuration, and the strap 72 extends from the head 74 so as to be perpendicular to the guide channel 76. When the strap is threaded through the guide channel 76, the sides of the rungs 98 engage seriatim against the deflectable pawl 90, thereby repeatedly deflecting the latter from the position shown in solid lines in FIG. 17 to the position shown in dash lines therein. It is believed quite advantageous in certain applications to provide the thin film 100 between the cross-bars or rungs 98. The inclusion of the film will facilitate the manufacturing operation since the strap can readily be molded in one operation with the film in place, and if the film is made sufficiently thin it will readily be pierced by the pawl 90 during locking of the strap. Specifically, the web will achieve an improved filling characteristic for the mold and avoid regions of possible failure.

In operation, the cable tie 70 is wrapped around a bundle of wires W or the like and the free end of strap is threaded through the guide channel 76 as shown in FIG. 17, whereby the pawl 90 is repeatedly deflected from the position shown in solid lines to the position shown in dash lines in the drawing as it is engaged seriatim by the various rung members 98. It will be noted that the presence of the film 100 between the rungs 98 reduces the magnitude of the deflection of the pawl 90 during the threading of the strap through the head 74. After the strap 72 has been drawn up tight around the bundle of wires W, and the threading force is relaxed, the compressed bundle will apply a reverse pull which tends to withdraw the strap from the head 74. However, the pawl 90 will then penetrate the thin film 100 as shown in FIG. 18, causing the pawl to deflect outwardly into the auxilliary channel 86 until it abuts against a ledge 102 at the end of the auxiliary channel.

It will be understood that with the pawl projecting through the strap and engaged against the ledge 102 as shown in FIG. 18, the strap will be securely locked against withdrawal from the head, and the deflectable pawl 90 will be firmly supported in its locked position. When in the locked position the trapped rung or cross-bar 98 is engaged against an inner wall 104 of the pawl member 90 rather than against the end of the pawl as in the prior embodiments, and in the locked position of the pawl the inner wall 104 is sloped so that continued reverse pull on the strap will tend to move the trapped rung 98 against the wall 84 to lock the same more securely.

FIGS. 20 and 21 show a modified cross-sectional configuration of the strap 72 wherein the strap comprises longitudinal side rails 92' and 94' which are oval or oblong in configuration, and a plurality of cross-bars or rungs 98' extend transversely between the rails at spaced intervals therealong. In such modified embodiment, a thin film 100' is formed between the rungs 98', the film being formed adjacent the edges of the rails 92' and 94' so as to prevent a non-symmetrical structure as shown in the drawings. It will however be understood that in operation the rungs 98' will be disposed so as to engage the locking pawl 90 and deflect the same during a threading operation substantially in the manner previously described in connection with FIG. 17.

Figure 22:
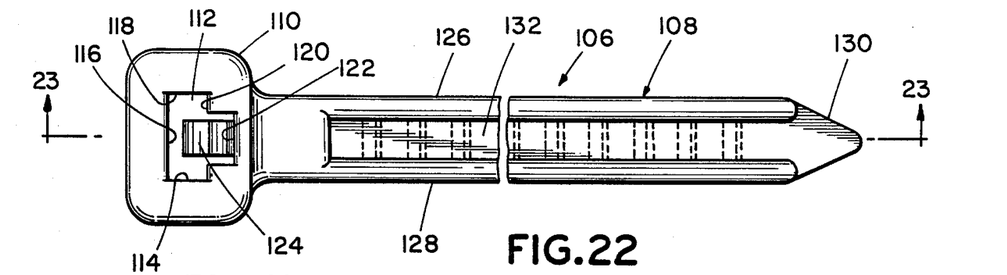
FIG. 22 is a plan view of another alternative embodiment of a ladder-type cable tie constructed in accordance with the present invention.
Figures 23, 24, 25, 26, 27, 28:
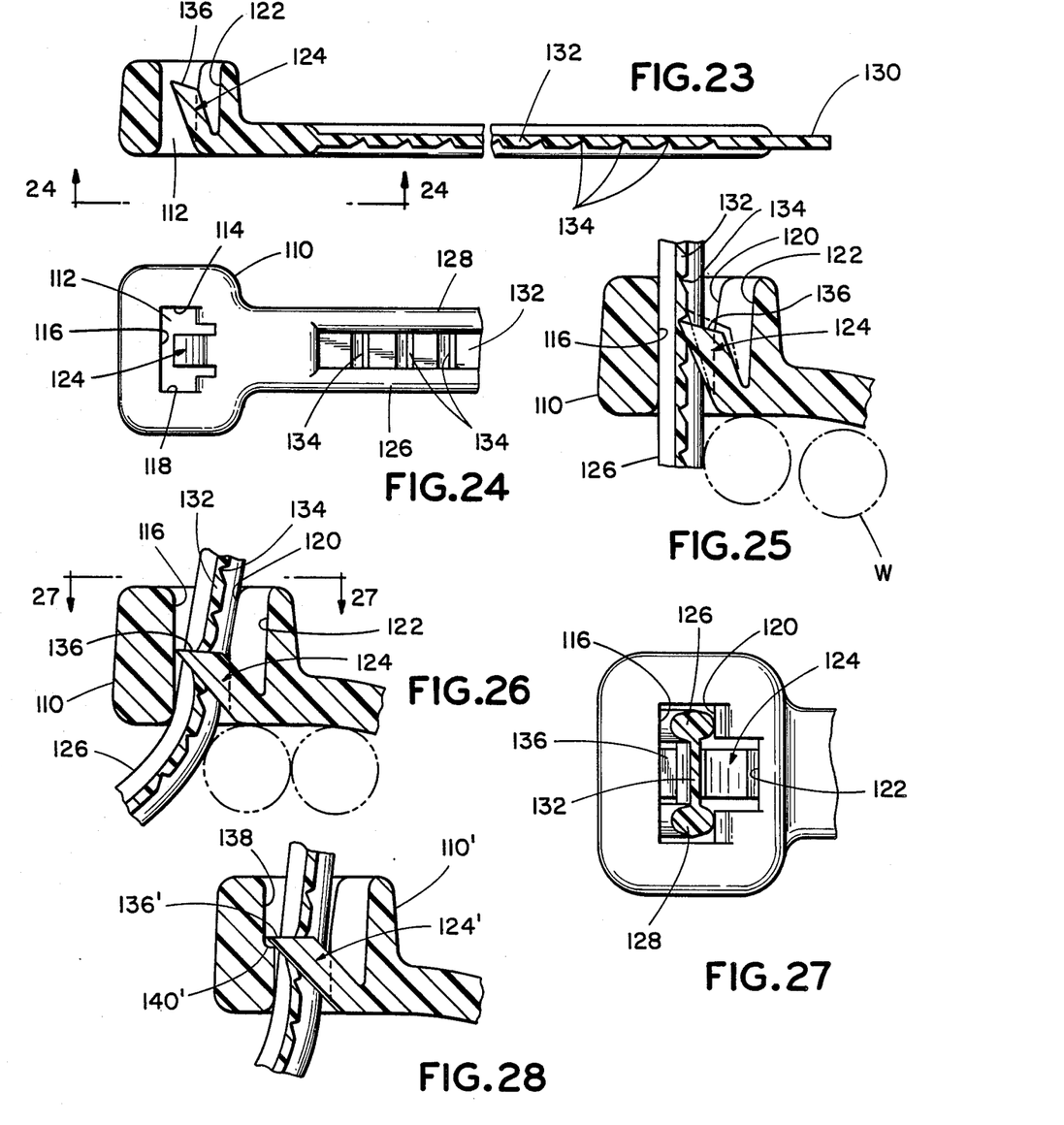
FIG. 23 is a sectional view taken substantially along the line 23—23 of FIG. 22.
FIG. 24 is a fragmentary view looking approximately in the direction of the arrows 24—24 of FIG. 23.
FIG. 25 is a fragmentary sectional view showing the strap being threaded through the head and pulled past a deflectable locking pawl disposed within the enclosed head.
FIG. 26 is a sectional view similar to FIG. 25 showing the strap after the threading force has been relaxed and the strap has been subjected to reverse thrust causing the pawl to penetrate a notched web portion of the strap body so as to project through the strap and lock the same against withdrawal.
FIG. 27 is a fragmentary plan view looking substantially in the direction of the arrows 27—27 of FIG. 26, the strap being shown in section.
FIG. 28 shows a modified form of the head structure of FIG. 26 wherein a ledge is formed in the head to support the locking pawl when the latter is in its locked position.

Reference is now made to FIGS. 22-27 which illustrate still another embodiment of the ladder-type cable tie of the present invention wherein a notched web is formed between a pair of longitudinal rails, the web body forming cross bars or rails and the notched portions of the web functioning as thin penetrable areas one of which is pierced by a deflectable pawl member during a locking operation. There is shown a cable tie 106 comprising a strap 108 having an integral head 110 formed at one end thereof. The head 110 has a guide channel 112 formed therein defined by walls 114, 116, 118 and 120, the latter wall having an auxiliary channel 122 formed therein. The head 110 is provided with an integral deflectable pawl 124 having its root portion disposed within the auxiliary channel 122, and when in its relaxed position the free end of the pawl extends into the guide channel 112 as shown in FIGS. 22 and 23.

The strap 108 comprises a pair of longitudinal rail or side members 126 and 128 which may be oval or circular in cross-sectional configuration and which terminate at a strap tail portion comprising a flat thin generally triangularly shaped tail member 130. The longitudinal rail members 126 and 128 are interconnected by a web 132 which extends the full length of the rails and is interrupted by a plurality of transverse notches 134 spaced apart along the length of the side rails.

In the foregoing embodiment, the tail 130 is of the same thickness as the web 132 and simply comprises a tapered end portion on the latter. The web 132 is made of a substantially greater thickness than the thin film described in the embodiment of FIGS. 14–19, since in the present embodiment the portions of the web between the notches 134 serve as the cross-bars or rungs of a ladder-type strap. On the other hand, the notched portions 134 must be sufficiently thin as to be readily pierced by the pawl 124 during locking of the strap.

In operation, the cable tie 106 is wrapped around a bundle of wires W or the like, and the free end of the strap is threaded through the guide channel 112 as shown in FIG. 25, whereby the pawl 124 is repeatedly deflected from the position shown in solid lines to the position shown in dash lines in the drawing as it is engaged by the rung portions of the web 132 intermediate the notches 134. After the strap has been drawn up tight around the bundle of wires W and the threading force is relaxed, the compressed bundle will apply a withdrawal pull on the strap causing the pawl 124 to pierce one of the notched areas 134 as shown in FIG. 26. The pawl 124 will thus be caused to project through the strap 108 and be deflected outwardly until it abuts against the outer channel wall 116 in which position the pawl will be firmly supported and the strap securely locked against withdrawal from the head 110. It will be noted that in the locked position the web 132 is engaged against an end wall 136 of the pawl.

FIG. 28 shows a modified form of the head member 110 where a second auxiliary channel 138 is formed in the head. In the modified embodiment, a pawl 124' is deflected outwardly into the auxiliary channel 138 during a locking operation until it abuts against a ledge 140 at the end of the channel.

FIGS. 29–32 disclose a releasable version of a ladder-type cable tie constructed in accordance with the present invention. There is shown a cable tie 142 comprising a strap 144 and an integral head 146. The head 146 is formed with a guide channel 148 defined by walls 150, 152, 154 and 156 (see FIG. 32). The wall 152 has a first auxiliary channel 158 formed therein, and the opposite wall 156 is provided with a second auxiliary channel 160. A pawl 162 is connected to the head 146 by a relatively thin, flexible portion 164, and a release tab 166 formed integral with the pawl 162 projects outwardly of the head through the first auxiliary channel 158.

Figures 29, 30, 31, 32, 33, 34, 35, 36:
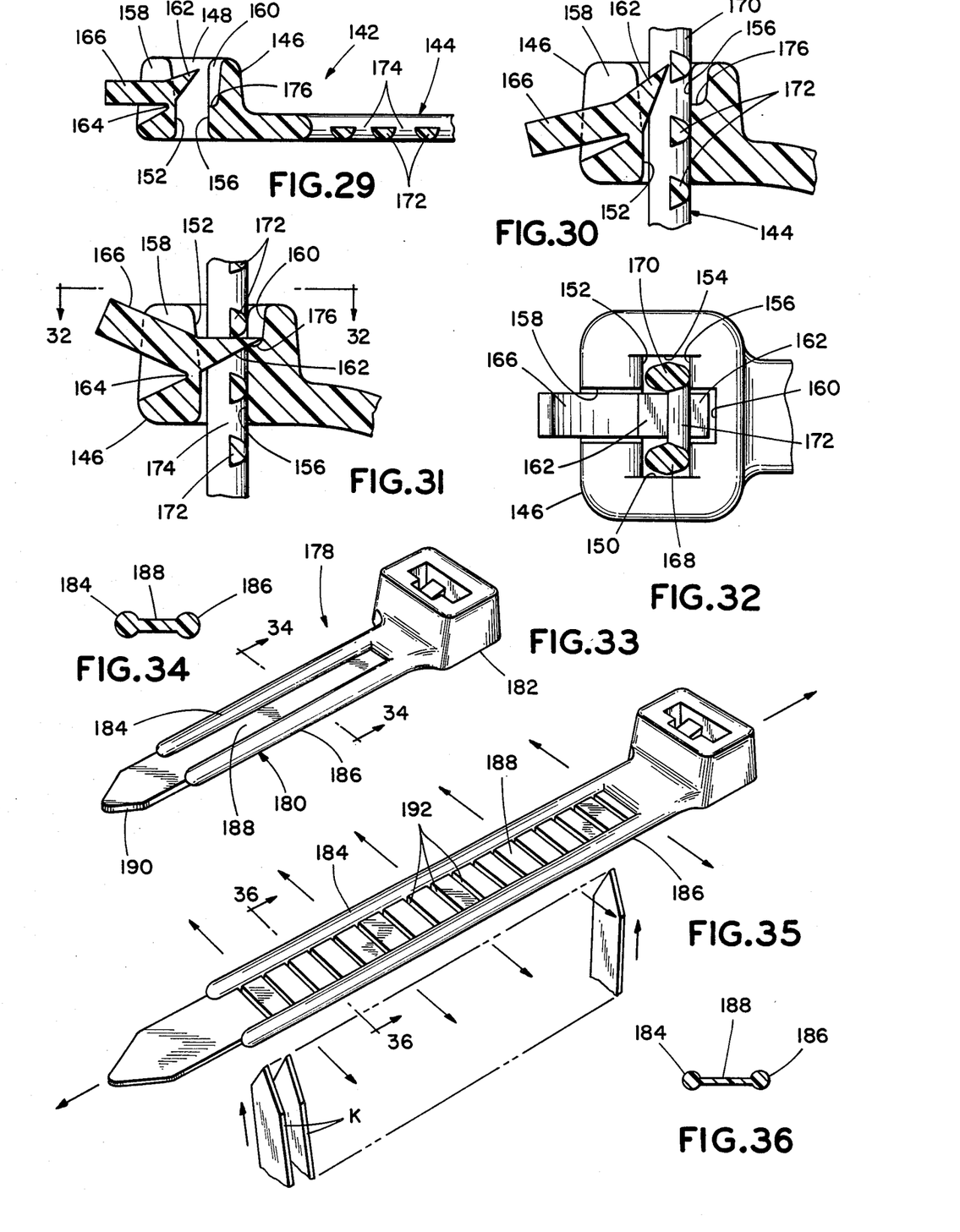
FIG. 29 is a fragmentary sectional view of still another alternative embodiment of a ladder-type cable tie constructed in accordance with the present invention including a releasable locking pawl.
FIG. 30 is a fragmentary sectional view showing the strap being threaded through the head and pulled past the locking pawl.
FIG. 31 is a sectional view similar to FIG. 30 showing the strap after the threading force has been relaxed and the strap subjected to reverse thrust and thereby moved to a locked position relative to the locking pawl.
FIG. 32 is a fragmentary plan view looking substantially in the direction of the arrows 32—32 of FIG. 31, the strap being shown in section.
FIG. 33 is a perspective view of still another embodiment of a cable tie constructed in accordance with the present invention, the cable tie being shown as molded prior to a stretching operation.
FIG. 34 is a sectional view taken substantially along the line 34—34 of FIG. 33.
FIG. 35 is a perspective view showing the molded cable tie of FIG. 33 after the cable tie has been stretched both longitudinally and transversely and transverse slits or openings have been cut into the strap by a plurality of knives as shown in the drawing.
FIG. 36 is a sectional view taken substantially along the line 36—36 of FIG. 35.

The strap 144 comprises a pair of longitudinal rails 168 and 170 (see FIG. 32) interconnected by a plurality of transverse rungs 172 of semi-circular cross-section spaced along the length of the rail members so as to define a plurality of intermediate openings 174. When the strap 144 is threaded through the head 146, the flat faces of the rungs 172 engage and deflect the pawl 162 as shown in FIG. 30, thereby causing the release tab 166 to move downwardly in the auxiliary channel 158. After the cable tie has been tightened around a bundle of wires or the like, and the threading force relaxed, the strap will tend to withdraw from the head. However, the pawl 162 will then project through one of the openings 174 in the strap and abut against a ledge or shoulder 176 at the end of the second auxiliary channel 160, thereby preventing withdrawal of the strap. It will be understood that the cable tie 142 can be released after being locked around a bundle of wires due to the provision of the tab 166 which projects outwardly from the head 146 and is accessible for manual manipulation from the locked position of FIG. 31 to the released position of FIG. 30.

FIGS. 33–36 disclose a further form of the present invention comprising a ladder-type cable tie which is molded and thereafter heated and stretched with the result that the cable tie as molded may be of substantially reduced size as compared to the desired final dimensions. FIG. 33 shows a cable tie 178 after a molding operation and prior to stretching. The cable tie 178 comprises a strap 180 and a head 182 formed integral with the strap at one end thereof. The pawl and other internal structure in the head 182 may take the form of any of the embodiments described previously herein, and thus no detail description of such structure is believed necessary. The strap 180 comprises a pair of longitudinal side rails 184 and 186 interconnected by a web portion 188 which extends the full length of the side rails and terminates in a tapered tail member 190. The side rails 184 and 186 are circular in their cross-sectional configuration, as best shown in FIG. 34.

It is important to understand that FIG. 33 shows the cable tie 178 in its "as molded" form in which the head 182 is of the desired final size and configuration, whereas the strap portion 180 is shorter, narrower and thicker than the desired final dimensions thereof. Figure 35 discloses the cable tie 178 after the strap has been heated and stretched both longitudinally and transversely, thereby increasing the length and width of the strap and reducing the thickness thereof. FIG. 35 further discloses a plurality of cutting knives K which are used to cut a plurality of transverse slits 192 in the web 188. Accordingly, the remaining portions of the web function as the transverse rung members described in the previous embodiments of a ladder-type strap, and the slits 192 constitute intermediate openings which cooperate with a locking pawl disposed within the head 182.

The foregoing cable tie and method of producing the same afford important advantages, since the molding of the shorter, narrower and thicker cable tie as shown in FIG. 33 provides a more efficient molding operation, and in addition, the stretching of the cable tie from its "as molded" configuration orients the plastic material and increases the strength thereof. In a preferred embodiment of the foregoing method of manufacture, the cable tie is removed from the mold while the strap portion is still in a heated and pliable condition from the molding operation whereby the strap can be stretched without a separate heating operation. On the other hand, if the cable tie is permitted to cool prior to the stretching thereof then a separate heating step is required prior to the stretching operation.

Figures 37, 38:
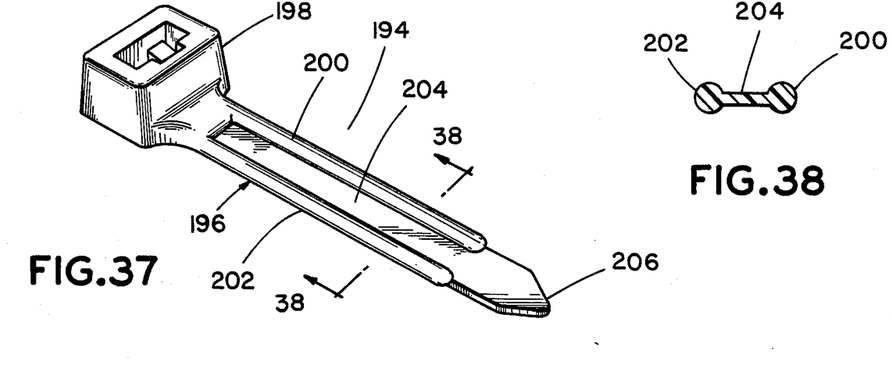
FIG. 37 is a perspective view similar to FIG. 33 showing a cable tie as molded prior to a stretching operation.
FIG. 38 is a sectional view taken substantially along the line 38—38 of FIG. 37.

FIGS. 37–43 disclose a further modified form of the present invention including localized heating of selected areas of the cable tie in conjunction with the stretching thereof. FIG. 37 discloses a cable tie 194 comprising a strap portion 196 and an integral head 198 at one end thereof. The pawl and other internal structure in the head 198 may take the form of any of the previous embodiments and need not be described herein. The strap 196 comprises a pair of longitudinal side rails 200 and 202 interconnected by a web portion 204 which extends the full length of the side rails and terminates in a tapered tail member 206. The side rails 200 and 202 are circular in cross-sectional configuration as shown in FIG. 38.

Figure 39:
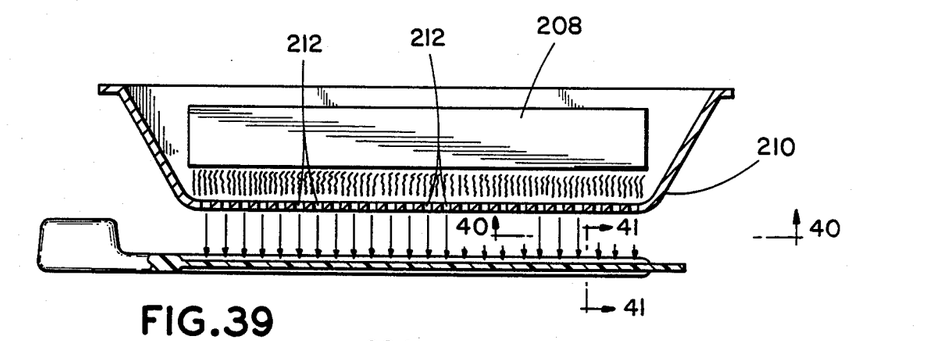
FIG. 39 is a generally schematic vertical sectional view illustrating apparatus comprising a heat source and a mask with openings therein for heating localized spaced areas of the strap portion of the cable tie of FIG. 37 prior to stretching the latter in a longitudinal direction.

FIG. 37 discloses the cable tie 194 in its "as molded" form in which the head is of the desired final size and configuration, while the strap portion 196 is shorter and thicker than the desired final size thereof. FIG. 39 schematically illustrates apparatus for heating localized areas of the web 204 in conjunction with longitudinal stretching of the strap. There is shown a heat source 208, and a mask 210 having a plurality of narrow, parallel slits or openings 212 therein. The mask 210 is disposed between the heat source 208 and strap 196 so as to apply heat to localized areas of the web portion 204 as controlled by the size and location of the openings 212 in the mask. After the heating of such localized areas, the strap is stretched longitudinally as much as several times its original length.

Figures 40, 41, 42, 43:
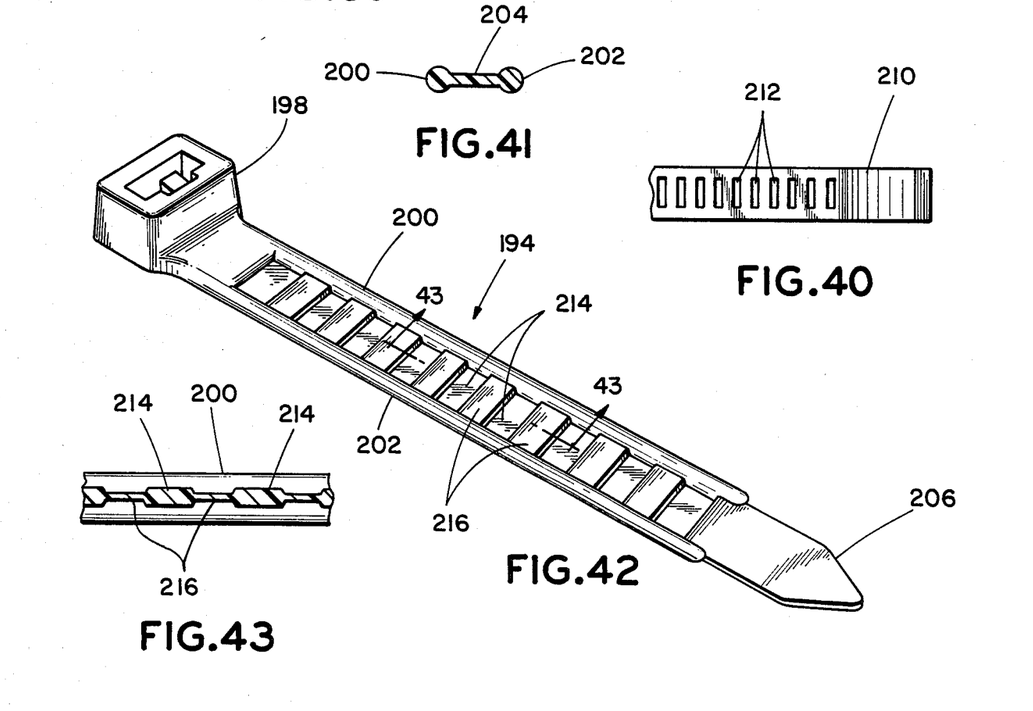
FIG. 40 is a fragmentary view looking approximately in the direction of the arrows 40—40 of FIG. 39 showing a portion of the underside of the mask.
FIG. 41 is a sectional view taken substantially along the line 41—41 of FIG. 39.
FIG. 42 is a perspective view illustrating the cable tie of FIG. 37 after the same has been heated and stretched in a longitudinal direction.
FIG. 43 is a fragmentary longitudinal section taken substantially along the line 43—43 of FIG. 42.

Because the heated areas of the web 204 will tend to stretch to a greater extent than the remaining areas thereof, the resulting web will comprise a plurality of alternate thick and thin sections as shown in FIG. 43. Consequently, the thicker web section 214 function as transverse rungs between the longitudinal rails 200 and 202, and the thinner section 216 function as thin, penetrable film portions readily capable of being pierced by a pawl member during a locking operation in the manner described previously herein.

In carrying out the foregoing process, it will be understood that the entire strap portion 196 must be in a heated condition in order to permit longitudinal stretching thereof. On the other hand, the objective is to heat up certain portions of the web 204 to a higher temperature than the remainder of the strap 196. As in the embodiment of FIGS. 33–36, it is preferred that the cable tie be removed from the mold while the strap portion is still in a heated and pliable condition which permits the strap to be stretched longitudinally. Preferably, the strap is stretched initially from its "as molded" length, after which additional heat is applied to localized areas of the web 204 by use of the apparatus as shown in FIG. 39, and thereafter final stretching of the strap is effected to produce a cable tie as illustrated in FIGS. 42 and 43. It will thus be understood that the entire body portion of the strap 196 must be in a heated condition in order to permit stretching thereof but additional heat is applied to spaced localized areas of the web portion 204 so as to cause additional stretching in such areas of the web and thereby produce alternate thick and thin web sections as above described.

I claim:

1. A flexible one-piece harnessing device comprising an elongated strap having one free end and having a head member integral with the opposite end thereof, a guide channel formed in said head for threading the free end of the strap therethrough, a locking tang disposed within said head member so as to project into said guide channel, said strap comprising a pair of parallel longitudinal side members interconnected by a plurality of transverse rungs spaced along the length of said side members and defining therebetween a plurality of openings for cooperation with said locking tang, whereby after the free end of the strap has been threaded through the guide channel and drawn tight around a bundle, and the threading force is thereafter relaxed, the compressed bundle will apply a reverse pull on the strap and the locking tang will project into one of said openings to trap an adjacent rung member and prevent withdrawal of the strap, said locking tang being flexible and integral with said head, said locking tang being confined within the body of said head, said rungs being semi-circular in cross-sectional figuration and having flat faces which engage seriatim against said locking tang when the free end of said strap is threaded through said guide channel.

2. A flexible one-piece harnessing device comprising an elongated strap having one free end and having a head member integral with the opposite end thereof, a guide channel formed in said head for threading the free end of the strap therethrough, a locking tang disposed within said head member so as to project into said guide channel, said strap comprising a pair of parallel longitudinal side members interconnected by a plurality of transverse rungs spaced along the length of said side members and defining therebetween a plurality of openings for cooperation with said locking tang, whereby after the free end of the strap has been threaded through the guide channel and drawn tight around a bundle, and the threading force is thereafter relaxed, the compressed bundle will apply a reverse pull on the strap and the locking tang will project into one of said openings to trap an adjacent rung member and prevent withdrawal of the strap, said locking tang being substantially rigid whereby when the free end of the strap is threaded through the guide channel the rungs engage said rigid locking tang causing deflection of the rungs as they snap past said locking tang.

3. A harnessing device as defined in claim 2 where a wall of said guide channel opposite said locking tang is curved as viewed along the axis of said guide channel, the end of said locking tang being spaced from said curved wall an amount which permits passage but requires deflection of each of said rungs from a normal straight configuration as the rung snaps past said locking tang after which each said rung is free to resume its normal straight configuration.

4. A harnessing device as defined in claim 2 where said rungs are semi-circular in cross-sectional configuration and have flat faces which engage against said rigid locking tang thereby causing deflection of said rungs as they snap past said locking tang.

5. A flexible one-piece harnessing device comprising an elongated strap having one free end and having a head member integral with the opposite end thereof, a guide channel formed in said head for threading the free end of the strap therethrough, said strap extending from said head perpendicular to said guide channel, a rigid locking tang integral with said head member and confined within the body of the latter so as to project into said guide channel, said strap comprising a pair of parallel longitudinal side members interconnected by a plurality of transverse rungs spaced along the length of said side members and defining therebetween a plurality of openings for cooperation with said locking tang, said guide channel including a curved wall opposite said locking tang, the end of said locking tang being spaced from said curved wall an amount which permits passage but requires deflection of each of said rungs from a normal straight configuration in order to snap past said locking tang after which each said rung is free to resume its normal straight configuration, whereby after the free end of the strap has been threaded through the guide channel and drawn tight around a bundle, and the threading force is thereafter relaxed, the compressed bundle will apply a reverse pull on the strap and the locking tang will project into one of said openings to trap an adjacent rung member and prevent withdrawal of the strap.

6. A harnessing device as defined in claim 2 where trapping of said adjacent rung member is effected by a sloping wall on said rigid locking tang, whereby reverse pull on the strap causes said adjacent rung to shift further toward an inner end of said locking tang thereby assuring the locking of said strap within said head.

7. A flexible one-piece harnessing device of molded plastic material comprising an elongated strap having one free end and having a head member integral with the opposite end thereof, a guide channel formed in said head for threading the free end of the strap therethrough, a locking tang disposed within said head member so as to project into said guide channel, said strap comprising a pair of parallel longitudinal side members interconnected by a plurality of transverse rungs spaced along the length of said side members defining therebetween intermediate areas for cooperation with said locking tang, a plastic film formed in said intermediate areas, said film being sufficiently thin to be penetrable by said locking tang during a locking operation, whereby after the free end of the strap has been threaded through the guide channel and drawn tight around a bundle, and the threading force is thereafter relaxed, the compressed bundle will apply a reverse pull on the strap causing said locking tang to pierce the film between two of said rungs and project through the film to trap an adjacent rung member and prevent withdrawal of the strap.

8. A harnessing device as defined in claim 7 where said locking tang is flexible and is integral with said head, said locking tang being confined within the body of said head.

9. A harnessing device as defined in claim 8 where a first auxiliary channel narrower than said guide channel is provided behind said locking tang for receiving the locking tang when the latter is deflected during threading of the strap through the head.

10. A harnessing device as defined in claim 9 including a second auxiliary channel narrower than said guide channel disposed opposite to said first auxiliary channel for receiving said locking tang when the latter is deflected during a locking operation.

11. A harnessing device as defined in claim 10 wherein said second auxiliary channel is formed with a ledge adjacent one end thereof for supporting said locking tang when the later is in its locked position.

12. A flexible one-piece harnessing device comprising an elongated strap having one free end and having a head member integral with the opposite end thereof, a guide channel formed in said head for threading the free end of the strap therethrough, a locking tang disposed within said head member so as to project into said guide channel, said strap comprising a pair of parallel longitudinal side members interconnected by a web which extends substantially along the entire length of said side members, said web having a plurality of transverse portions of reduced thickness spaced along the length of said side members for cooperation with said locking tang, said transverse portions being sufficiently thin to be penetrable by said locking tang during a locking operation, whereby after the free end of the strap has been threaded through the guide channel and drawn tight around a bundle, and the treading force is thereafter relaxed, the compressed bundle will apply a reverse pull on the strap causing said locking tang to pierce one of said transverse portions and project through the web to trap an adjacent rung member and prevent withdrawal of the strap.

13. A harnessing device as defined in claim 12 where a plurality of transverse notches are formed in said web to provide said portions of reduced thickness, whereby during a locking operation said locking tang will pierce through one of the notched portions of said web.

14. A harnessing device as defined in claim 13 where said locking tang is flexible and is integral with said head, said locking tang being confined within the body of said head.

15. A one-piece harnessing device comprising an elongated strap having one free end and having a head member integral with the opposite end thereof, a guide channel formed in said head for threading the free end of the strap therethrough, a locking tang disposed within said head member so as to project into said guide channel, said strap comprising a pair of parallel longitudinal side members interconnected by a plurality of transverse rungs spaced along the length of said side members and defining therebetween a plurality of openings for cooperation with said locking tang, whereby after the free end of the strap has been threaded through the guide channel and drawn tight around a bundle, and the threading force is thereafter relaxed, the compressed bundle will apply a reverse pull on the strap causing said locking tang to project through one of said openings to trap an adjacent rung member and prevent withdrawal of the strap, said head having an opening therein behind said locking tang, and said locking tang being flexibly connected to said head and having an integral release tab extending outwardly through the opening in said head to be accessible for manual manipulation to move said locking tang to a released position and permit withdrawal of the strap from said head.

16. A harnessing device as defined in claim 15 where an auxiliary channel narrower than said guide channel is formed on one side of said guide channel opposite said locking tang for receiving the end of said locking tang when the latter is in its locked position.

17. A harnessing device as defined in claim 16 where a ledge is formed at one end of said auxiliary channel for supporting the end of said locking tang when the latter is in its locked position.

18. A method of making a harnessing device having an elongated strap and integral head member comprising the steps of molding the device of a plastic material, the strap as molded being substantially shorter than its final desired length, and stretching said strap both longitudinally and transversely to a substantially greater length and width subsequent to the molding operation.

19. A method of making a harnessing device having an elongated strap and integral head member comprising the steps of molding the device of a plastic material, the strap as molded being substantially shorter than its final desired length, and stretching said strap to a substantially greater length subsequent to the molding operation, said device being molded with a strap portion comprising a pair of parallel side members interconnected by a web portion which extends substantially the full length of said side members, including the steps of heating longitudinally spaced localized areas of said web portion, and thereafter stretching said strap longitudinally whereby said web will be formed as alternate thick and thin portions capable of functioning as transverse rungs and intermediate penetrable portions of a ladder type harnessing device.

20. The method of fabricating a harnessing device which comprises: injecting a thermoplastic material into a mold for producing a head portion having an elongated guide channel extending therethrough, and a ladder structure with rungs that cross couple side rails and are engageable by a locking tang within said head portion, said head portion being attached to one end of said ladder structure; providing webbing between adjoining rungs and thinner than said rungs to achieve an improved filling characteristic for said mold and avoid regions of possible failure.

21. The method of claim 20 wherein said thermoplastic material is stretched orientable, and said strap is stretched to reduce the thickness thereof and improve the strength characteristic thereof.

22. A stretched thermoplastic harnessing device comprising, a head portion having an elongated guide channel extending therethrough, said head portion having a deflectable pawl extending into said channel, a strap portion extending from said head portion for positioning in said guide channel, said strap portion comprising a pair of side rails having rungs extending therebetween and a web between adjoining rungs, said pawl being deflectable from a threading position wherein said strap may be inserted into said channel to a locked position wherein said pawl engages one of said rungs to lock said strap against removal from said head, said pawl and the engaged portion of one of said rungs being positioned within said head in the locked position, said web having a thickness thinner than a thickness of said rungs.

23. The harnessing device of claim 22 wherein said rungs are symmetrical about an axis passing longitudinally through said web.

24. The harnessing device of claim 23 wherein said rungs have a thickness at least two times the thickness of said web.

25. The harnessing device of claim 24 wherein said rungs are symmetrical bout an axis perpendicular to said web.

26. The harnessing device of claim 22 wherein said rungs have a thickness at least two times the thickness of said web.

27. The harnessing device of claim 22 wherein said rungs are symmetrical about an axis perpendicular to said web.

28. The harnessing device of claim 23 wherein said rungs are symmetrical about an axis perpendicular to said web.

29. The harnessing device of claim 24 wherein said rungs are symmetrical about an axis perpendicular to said web.

30. The harnessing device of claim 22 wherein a ledge is positioned on a wall of said head opposite the guide channel from said pawl 31. The harnessing device of claim 22 wherein said web has a substantially uniform cross section.

32. The harnessing device of claim 23 wherein a ledge is positioned on a wall of said head opposite the guide channel from said pawl.

33. The harnessing device of claim 23 wherein said web has a substantially uniform cross section.

34. The harnessing device of claim 24 wherein a ledge is positioned on a wall of said head opposite the guide channel from said pawl.

35. The harnessing device of claim 24 wherein said web has a substantially uniform cross section.

36. The harnessing device of claim 26 wherein a ledge is positioned on a wall of said head oppostie the guide channel from said pawl.

37. The harnessing device of claim 26 wherein said web has a substantially uniform cross section.

38. The harnessing device of claim 22 wherein said web is penetrable by said pawl.

39. The harnessing device of claim 24 wherein said rungs have a substantially flat surface and a thickness of said rungs is less than a thickness of said side rails.

* * * * *